United States Patent
Kesavan et al.

(10) Patent No.: US 10,171,387 B2
(45) Date of Patent: Jan. 1, 2019

(54) MESSAGE RETRIEVAL IN A DISTRIBUTED COMPUTING NETWORK

(71) Applicant: International Business Machines Corporation, Armonk, NY (US)

(72) Inventors: Sanjay M. Kesavan, Bangalore (IN); Rajesh Lalgowdar, Bangalore (IN); Ian Robinson, Southampton (GB); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 14/567,089

(22) Filed: Dec. 11, 2014

(65) Prior Publication Data

US 2016/0173420 A1 Jun. 16, 2016

(51) Int. Cl.
*H04L 12/58* (2006.01)
*H04L 29/08* (2006.01)
*G06F 17/30* (2006.01)
*H04L 29/06* (2006.01)

(52) U.S. Cl.
CPC ...... *H04L 51/046* (2013.01); *G06F 17/30188* (2013.01); *H04L 51/20* (2013.01); *H04L 67/1095* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 8,291,036 B2 | 10/2012 | Poluri et al. | |
| 8,589,732 B2 | 11/2013 | Krishnaprasad et al. | |
| 8,627,333 B2 | 1/2014 | Chen et al. | |
| 8,676,984 B2 | 3/2014 | Acharaya et al. | |
| 2008/0005226 A1* | 1/2008 | Subbian | H04L 51/066 709/203 |
| 2011/0119729 A1* | 5/2011 | Bergeson | G06F 9/5061 726/1 |
| 2016/0099896 A1* | 4/2016 | Huang | H04L 63/083 709/206 |
| 2016/0140550 A1* | 5/2016 | Keys | H04L 63/0838 726/9 |

FOREIGN PATENT DOCUMENTS

WO 2013064947 A1 5/2013

OTHER PUBLICATIONS

U.S. Appl. No. 14/843,107, filed Sep. 2, 2015 entitled "Message Retrieval in a Distributed Computing Network".
Appendix P "List of IBM Patents or Patent Applications Treated as Related" dated Sep. 2, 2015; 2 Pages.
Jimerson, Brian, "Software Architecture for High Availability in the Cloud", Oracle Technology Network, Published Jun. 2012, <http://www.oracle.com/technetwork/articles/cloudcomp/jimerson-ha-arch-cloud-1669855.html>.
McKeown et al., "Disaster Recovery and High Availability for Azure Applications", Updated: Apr. 8, 2014, © 2014 Microsoft, <http://msdn.microsoft.com/en-us/library/dn251004.aspx>.

* cited by examiner

*Primary Examiner* — Angela Nguyen
(74) *Attorney, Agent, or Firm* — Gilbert Harmon, Jr.; Stephen R. Yoder

(57) ABSTRACT

Applications retrieve physical messages from one of either a co-located, passive messaging engine within the same datacenter as the application, or a nearest passive messaging engine from a different datacenter instead of from the active messaging engine. In that way, the active messaging engine does not deliver the physical message directly from its local storage.

10 Claims, 10 Drawing Sheets

MESSAGE RETRIEVAL IN A DISTRIBUTED COMPUTING NETWORK

BACKGROUND OF THE INVENTION

The present invention relates generally to the field of data communication, and more particularly to allocating messages.

Cloud computing refers to the delivery of computing as a service rather than a product. Shared resources, software, and information are provided to computers and other devices as a utility (like the electricity grid) over a network (typically the Internet). Cloud computing provides computation, software, data access, and storage services that do not require end-user knowledge of the physical location and configuration of the system that delivers the services.

One of the core components of cloud computing is the messaging layer. The messaging layer enables asynchronous communication between applications (clients). It also enables intracloud components to communicate with each other in an asynchronous manner. For example, in a cloud foundry environment, the cloud controller places the request in the messaging bus, which is read by the droplet execution agent (DEA) in order to process the requests.

Once and only once delivery, and assured delivery (or guaranteed delivery of messages), are two notable characteristics of messaging. One message cannot be delivered more than once to any consumers with once and only once delivery. The once and only once delivery model of the messaging layer differentiates it from other existing technologies like database, caching, and content delivery network. The once and only once delivery model works on the principle of the write once and read once (WORO) model. Whereas, the existing technologies mentioned work on write once and read multiple (WORM) model. With the "assured delivered" approach of the WORM model, the available "state" of the messages must persist until the consumer consumes the message. It should be noted that the "once and only once delivery" model may also be referred to in the art as the "exactly once" model.

In cloud computing, it is desirable to provide continuous availability, high availability (HA), and fault tolerance. One reason this (combination) is desired is in the event a datacenter goes down. If a datacenter goes down, another datacenter will be available to service clients without any data loss or downtime. Generally, this is achieved by regularly backing up data between datacenters, either synchronously or asynchronously.

SUMMARY

According to an aspect of the present invention, there is a method, computer program product, and/or system that performs the following steps (not necessarily in the following order): (i) determining the receipt of a message by a first message store for a recipient device; (ii) locating a second message store where the recipient can retrieve the message; and (iii) authorizing a single-purpose communication between the recipient and the second message store, the single-purpose being to retrieve the message. At least the locating and authorizing steps are performed by computer software running on computer hardware.

DETAILED DESCRIPTION

Figure 1:
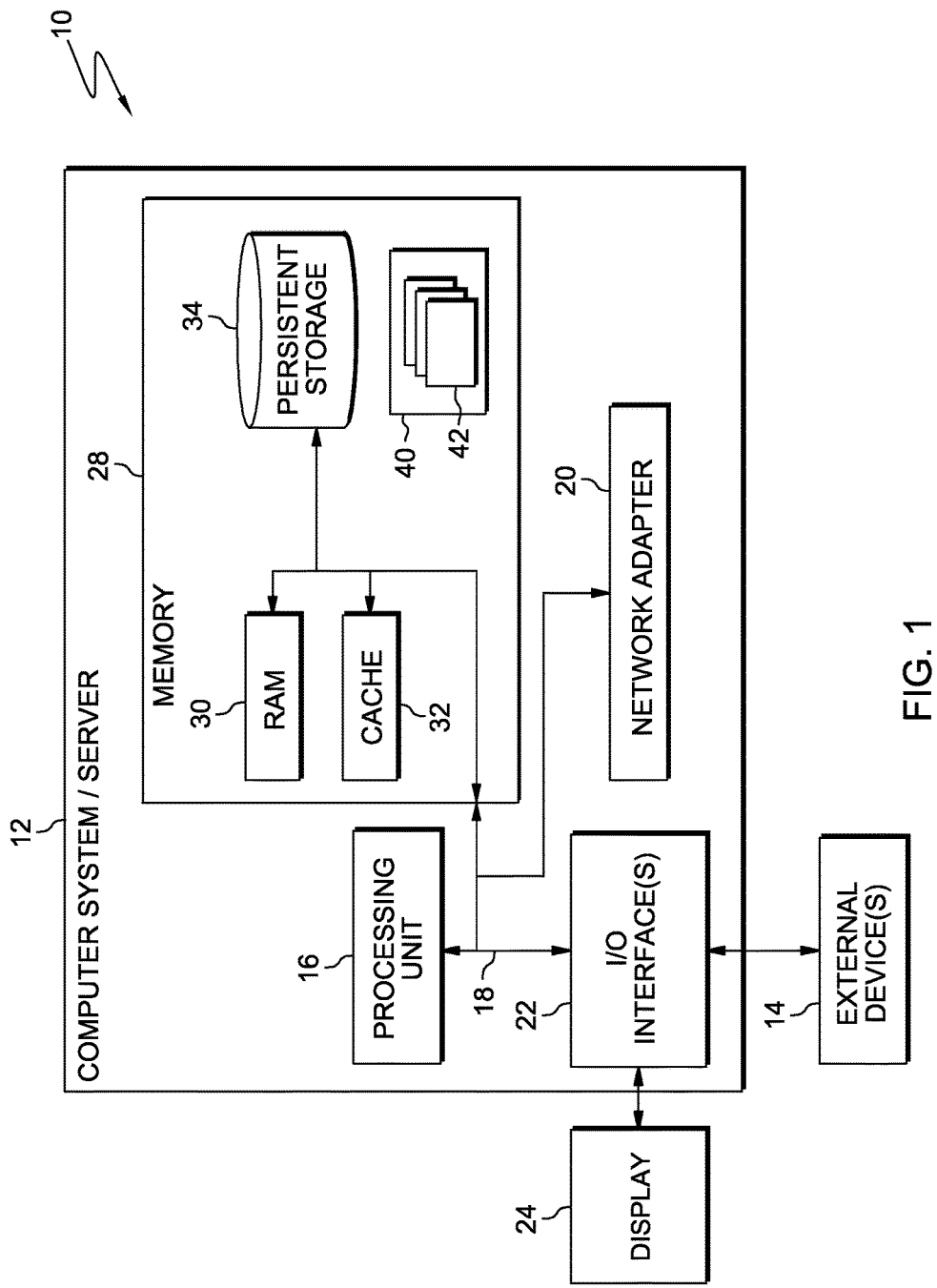
FIG. 1 depicts a cloud computing node used in a first embodiment of a system according to the present invention.

Applications retrieve physical messages from one of either a collocated (also written as co-located), passive messaging engine within the same datacenter as the application, or a nearest passive messaging engine from a different datacenter instead of from the active messaging engine. In that way, the active messaging engine does not deliver the physical message directly from its local storage. This Detailed Description section is divided into the following sub-sections: (i) The Hardware and Software Environment; (ii) Exemplary Embodiments; (iii) Alternative Embodiment; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant, or multi-zone, model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
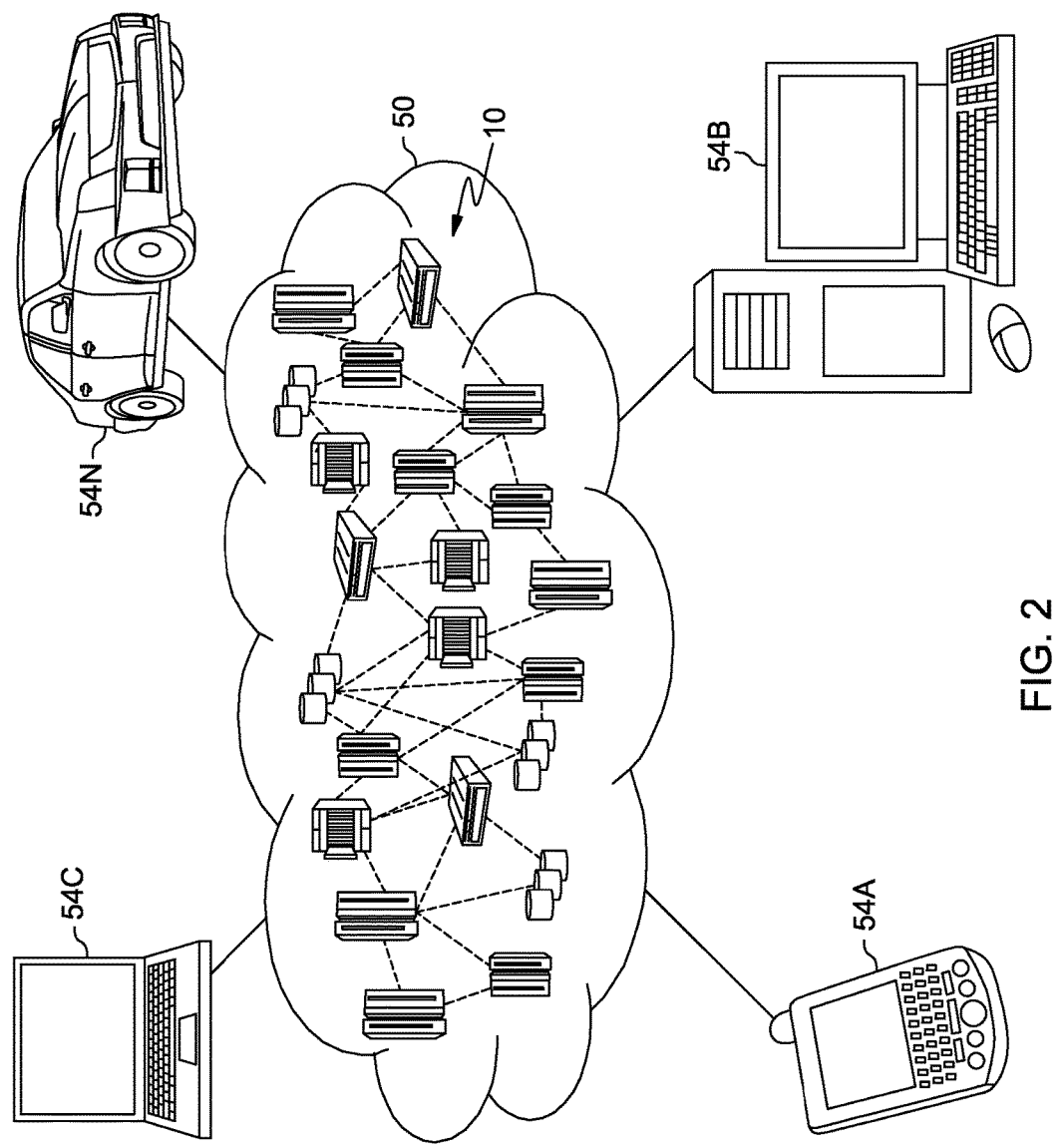
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
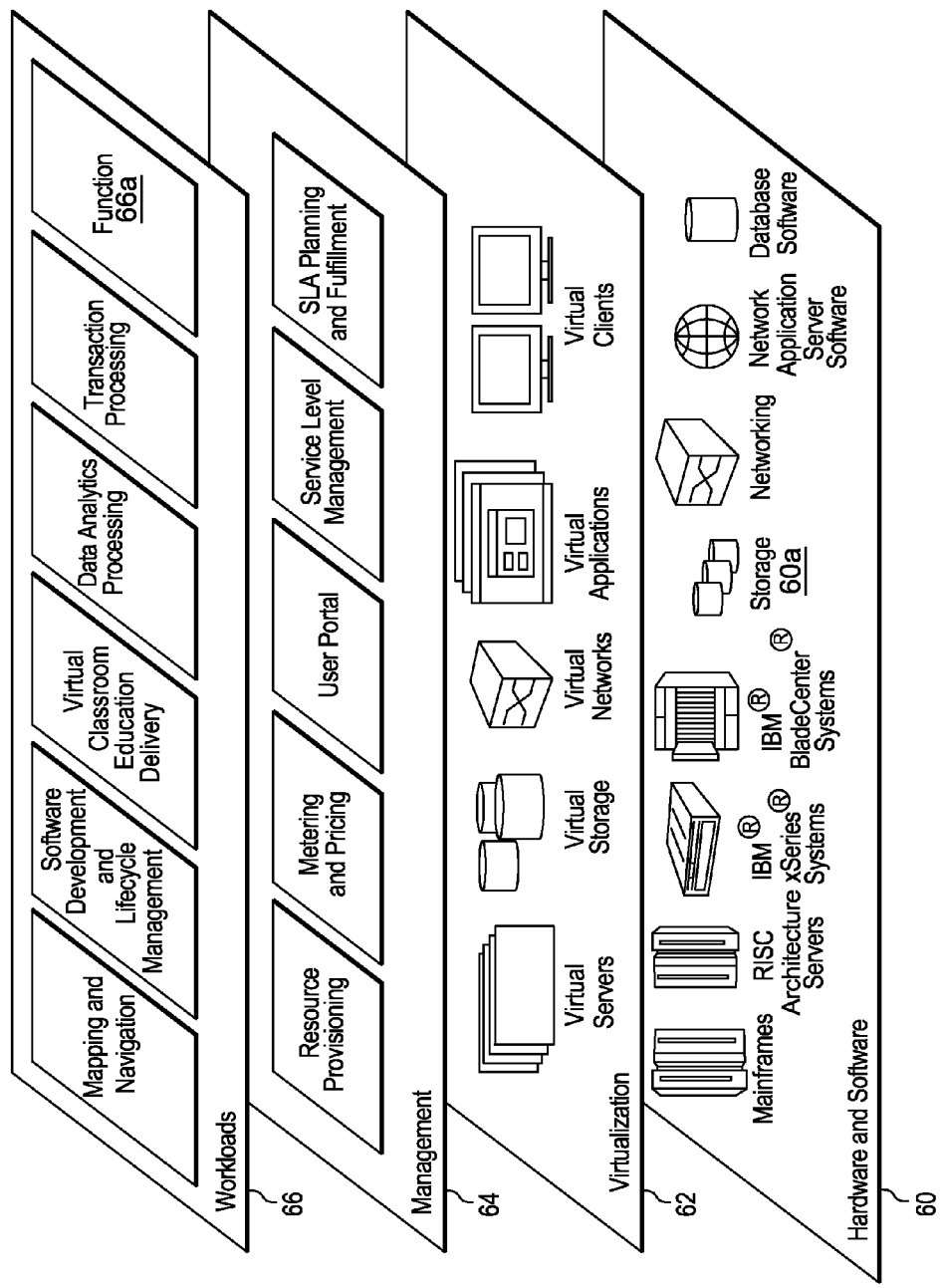
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXEMPLARY EMBODIMENTS

The requirement of the messaging infrastructure within the cloud environment poses several challenges, considering the quality of services the messaging layer provides. Some embodiments of the present invention recognize the following facts, potential problems, and/or potential areas for improvement with respect to the current state of the art: (i) the message engine is replicated across multi-cloud environments; (ii) several applications connecting to one of the messaging engines to retrieve the physical messages; (iii) applications do not always connect to the same message engine that contains the messages; (iv) the "write once and read once" model of messaging is challenging in the cloud environment because two or more active message engines sharing the same message across or within a datacenter breaks the "once and only once delivery" model; (v) the passive message engine cannot deliver messages to applications since this can cause data integrity and duplicate message processing issues leading to challenges with performance, network bandwidth, higher latency issues, and message payloads being sent across datacenters multiple times; and/or (vi) the same message cannot be cached across cloud zones when scalability is desired, resulting in one active message engine with the ability to hold reference of physical messages that need to be delivered to clients.

It should be noted here that throughout this detailed description, the terms "messaging engine" and "message engine" are used frequently and interchangeably. There is not distinction being made between the two terms.

Some embodiments of the present invention ensure that an application always connects to the active messaging engine instance, while providing a solution to allow applications to retrieve messages from a collocated passive messaging engine within their own local cloud instance. This is accomplished without violating the "once and only once delivery" model, which ensures maintenance of data integrity and scalability. The applications are not allowed to directly connect to any of the passive messaging engines to retrieve a message, that is, the passive messaging engines reject any direct connections from applications. However, an application is allowed to retrieve a message from a passive messaging engine when the application physically connects to the active messaging engine. The active messaging engine provides both the location and the unique message engine token of the appropriate passive messaging engine to the application, along with a unique token for each message (such as the message ID). In some embodiments, the application must use both the unique message engine token as well as the unique token for each message in order to retrieve the message from the passive messaging engine. Alternatively, a single unique token provides access to both the appropriate active messaging engine and the specific message(s) for the requesting application. This arrangement ensures that all the transactions, security, and data integrity is still maintained by the active messaging engine, but provides the option to retrieve the actual, physical payload of the message from the collocated passive messaging engine either within the same data center or within the distributed cloud environment. If the passive messaging engine is not reachable, the application is provided the following options: (i) retrieve the message from the nearest passive messaging engine (for example, the nearest geographical location); and (ii) directly fetch the message from the active messaging engine. It should be noted that, for some embodiments of the present invention, at any point during processing the transaction, if the application loses connectivity to the active messaging engine, the entire transaction is rolled back.

A unique token, as discussed herein, refers to a unique token, or identifier, that is unique to each messaging engine. This unique token is exchanged between each messaging engine during an initial handshake. The active messaging engine sends the client, or application, this unique token based on the messaging engine to which the client should connect in order to retrieve a waiting message payload.

Figure 4:
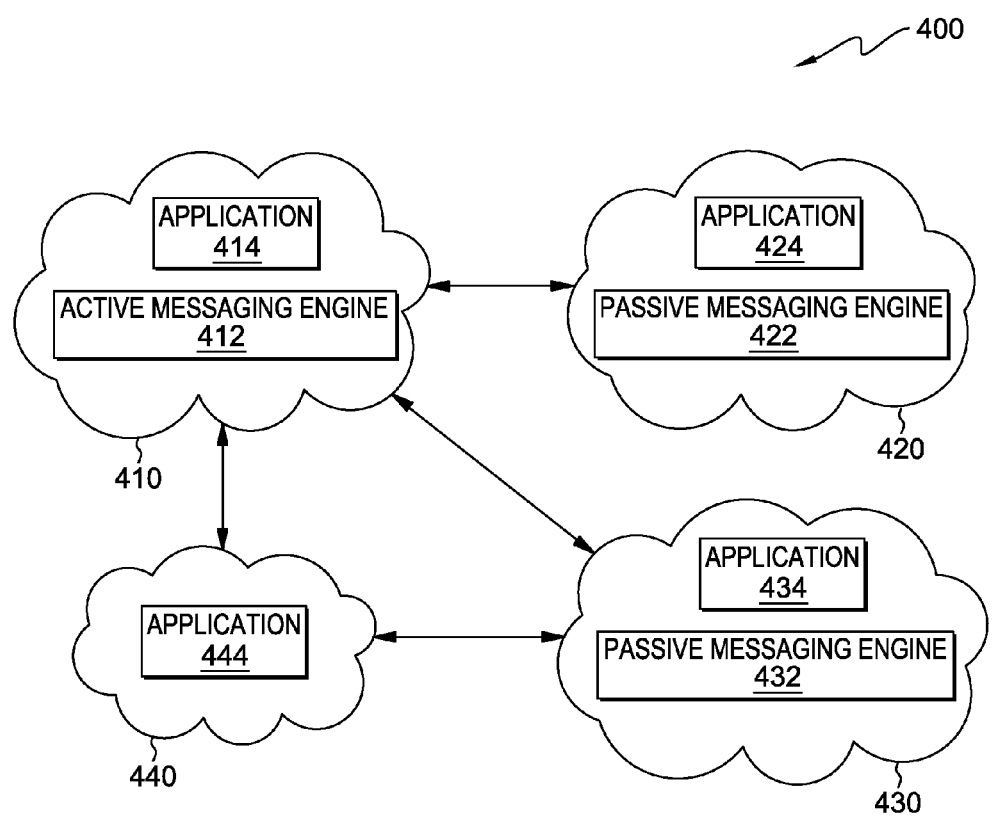
FIG. 4 is a group of cloud computing nodes according to the present invention.

FIG. 4 shows data center network 400, a group of cloud computing nodes within cloud computing environment 50 (See FIG. 2). FIG. 4 is a system view of data center network 400 including: data centers (or nodes) 410, 420, 430, 440; active messaging engine 412; passive messaging engines 422, 432; and applications (also referred to as clients) 414, 424, 434, 444. In this embodiment data center network 400 is in a private cloud network. Alternatively, the data center network is in a community, public, and/or hybrid cloud network as described above. Alternatively, the data center network 400 is a multi-cloud (also referred to as multi-zone), environment.

Figure 5A:
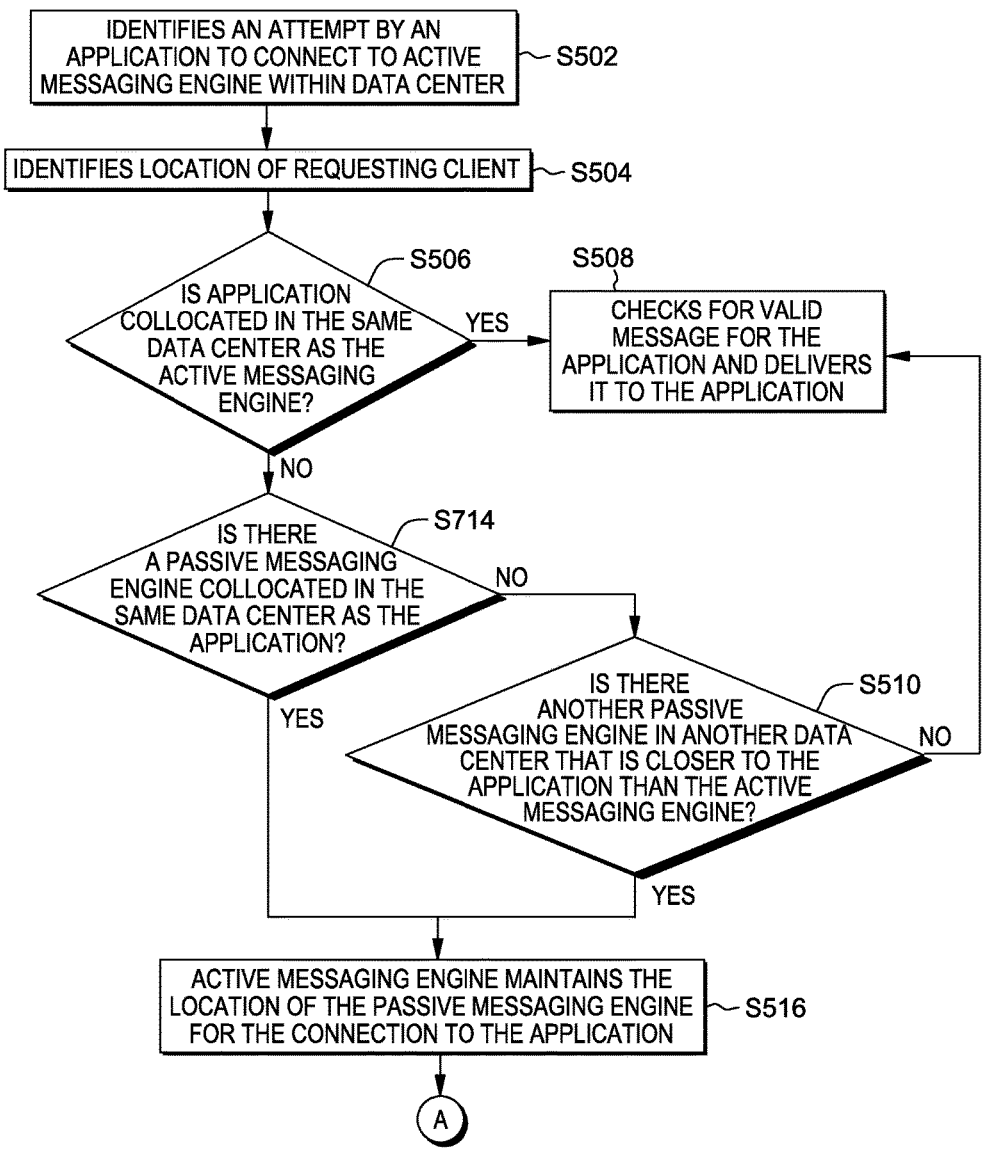
FIGS. 5A, 5B, and 5C are flowcharts of a method performed, at least in part, by the cloud computing nodes of FIG. 4.
Figure 5B:
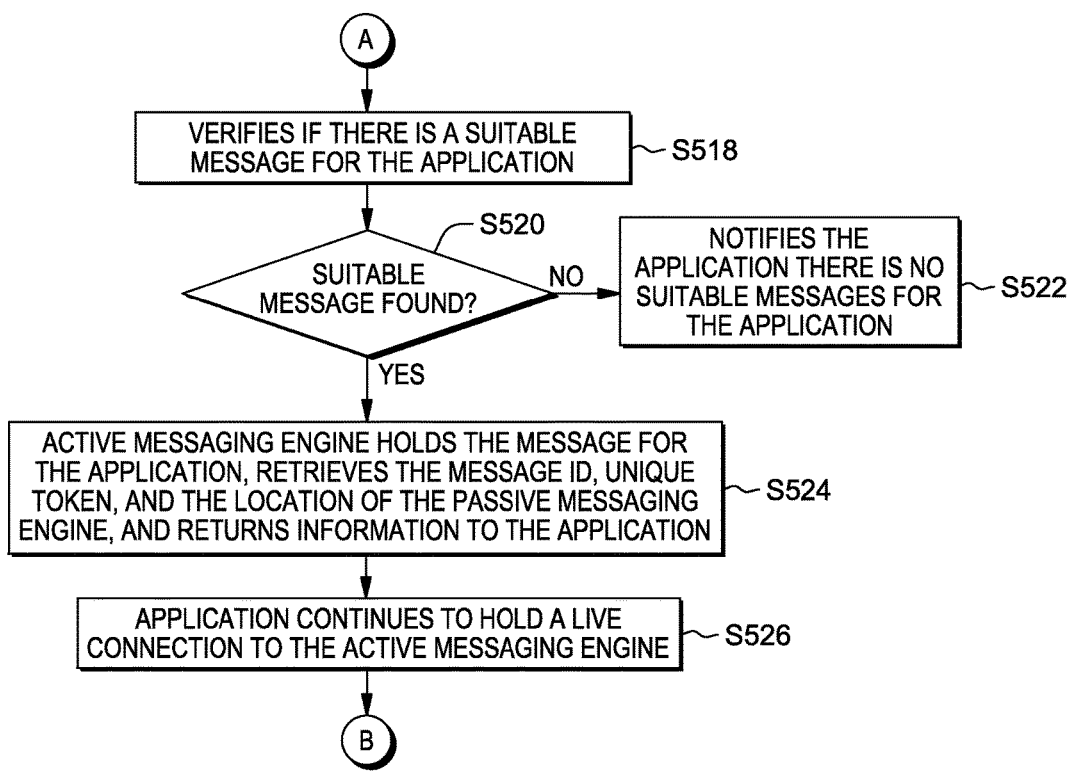
Figure 5C:
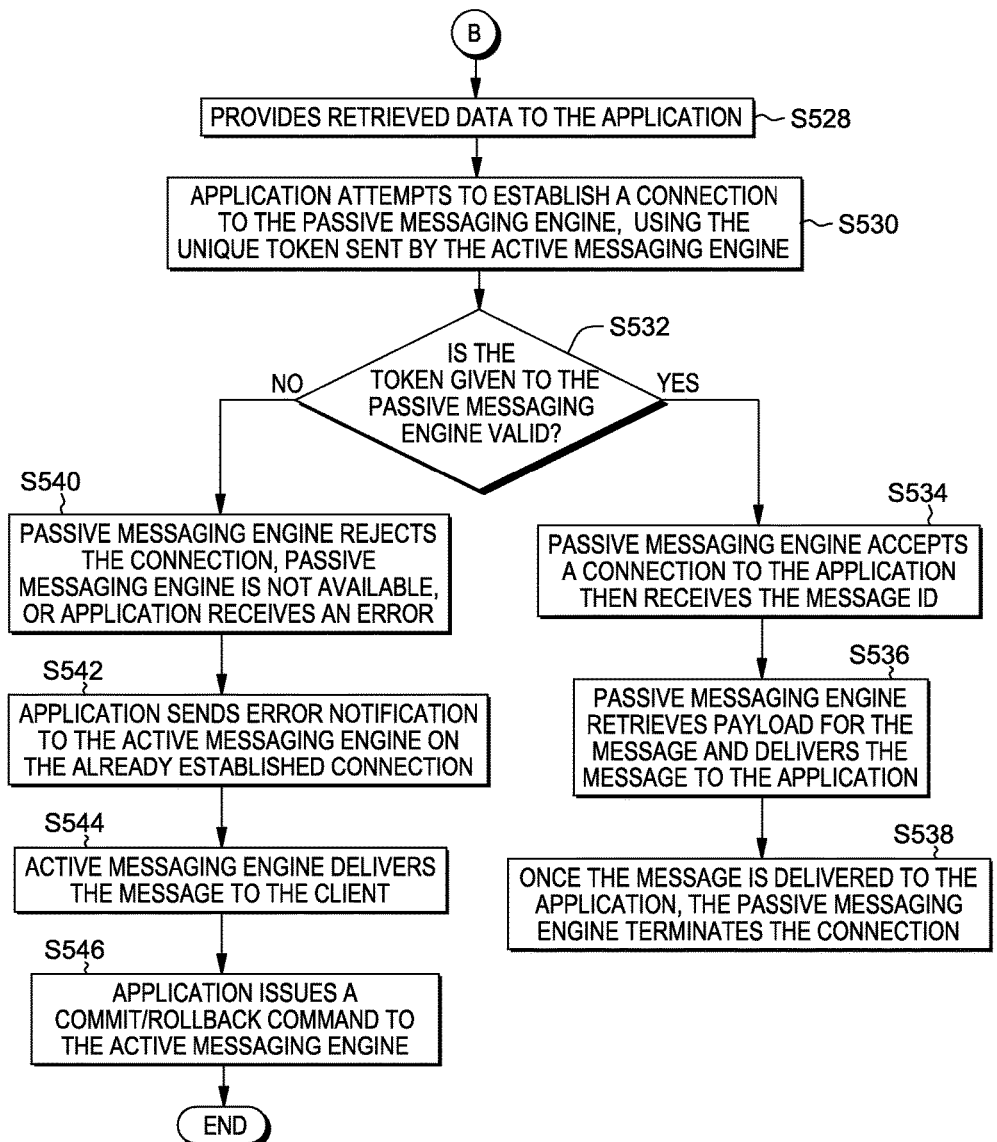
Figure 6:
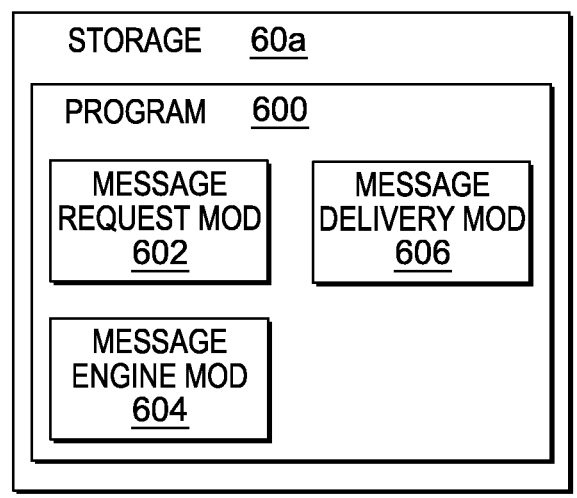
FIG. 6 is a block diagram view of a machine logic (for example, software) portion of the first embodiment system.

FIGS. 5A, 5B, and 5C show flowcharts depicting a method according to the present invention. FIG. 6 shows program 600 for performing at least some of the method steps in FIGS. 5A, 5B, and 5C. This method and associated software will now be discussed, over the course of the following paragraphs, with extensive reference to FIGS. 5A, 5B, and 5C (for the method steps) and FIG. 6 (for the software blocks). As shown in FIG. 6, one physical location where program 600 may be stored is in storage block 60a (see FIG. 3).

Starting with FIG. 5A, processing begins at step S502, where message request module (mod) 602 (FIG. 6) identifies an attempt by a consumer application to look up the data center network (as a cloud messaging service) in order to connect to active messaging engine 412 within data center 410. In this example, the look up originates with one of applications 414, 424, and 434.

Processing proceeds to step S504, where message request mod 602 identifies the location of requesting client (or application). The location information is retrieved when the application establishes a connection with the active messaging engine. The application provides the location information for the messaging engine. Location information includes, for example: (i) the host name; (ii) IP (internet protocol) address; and (iii) port, and geo-location where the data center is located.

Processing proceeds to step S506, where messaging engine mod 602 determines if the location of the requesting client corresponds to the data center, or node, where active messaging engine 412 is located. If, for example, the requesting client is application 414, collocated with active message engine 412, then processing proceeds down the "Yes" branch to step S508. Otherwise, if the requesting client is, for example, application 424, located in a different node than the active messaging engine, then processing proceeds down the "No" branch to step S514.

Following the "Yes" branch, processing ends at step S508, where message delivery mod 606 (FIG. 6) checks the message repository (not shown) in data center 430 to determine if there is a valid message for client 412 and, if so, delivers the message(s) to the client.

Following the "No" branch, processing proceeds to step S714, where messaging engine mod 604 (FIG. 6) determines if there is a passive messaging engine collocated along with the client in a particular data center. For example, the messaging engine mod may determine that requesting client, client 434, is collocated with passive messaging engine 432. In that case, processing proceeds down the "yes" branch. If there is no passive messaging engine collocated along with the requesting client, processing proceeds down the "no" branch.

Following the "Yes" branch, processing proceeds to step S516, where message delivery mod 606 records the location information for the passive messaging engine with respect to the requesting client. Some embodiments of the present invention provide for the active messaging engine to maintain location information for an application, to reference when a next message request is received by message request module 602.

Following the "No" branch, processing proceeds to step S510, where messaging engine mod 604 determines if there is a passive messaging engine in other cloud zones, or nodes, that are effectively closer (or closest, for environments having multiple passive messaging engines) to the client than the active messaging engine. For example, the messaging engine mod determines that requesting client 444 is not collocated with a passive messaging engine, but passive messaging engine 432 is located close to the requesting client. A determination is made as to whether passive messaging engine 432 is effectively closer to the requesting client than active messaging engine 412.

Some embodiments of the present invention use the IP address as a key source to determine the location from where a request originates. Alternatively, the IP address, combined with geo-location information for the data center, provide for determining where a request originates. Alternatively, the effective location of the request originator is determined according to ways now known, or to be known, in the art. If the located passive messaging engine is closer to the client, processing proceeds down the "Yes" branch to step S516, discussed above. If the active messaging engine is determined to be closer to the client than the located passive message engine, processing proceeds down the "No" branch to end at step S508, discussed above.

Following a process that passes through step S516, processing proceeds to step S518 (see FIG. 5B), where message request mod 602 verifies if there is a suitable message in the message repository (not shown) for the requesting client.

Processing proceeds to step S520, where message request mod 602 determines whether a suitable message is located. If a suitable message is located, processing proceeds down the "Yes" branch to step S524. If no suitable message is found, processing proceeds down the "No" branch to step S522.

Following the "No" branch, processing ends at step S522, where message delivery mod 606 notifies the requesting client that there are no suitable messages for the consumer.

Following the "Yes" branch, processing proceeds to step S524, where message delivery mod 606 locks the located message(s) for the requesting client at active messaging engine 412 and retrieves the following data: (i) message identification(s) for the located message(s); (ii) unique token; and (iii) the location of the recorded passive messaging engine corresponding to the requesting client.

Processing proceeds to step S526, where messaging engine mod 604 retains the connection between the requesting client and the active messaging engine.

Processing proceeds to step S528 (see FIG. 5C), where messaging engine mod 604 provides the data retrieved in step S524 to the requesting client. It should be noted that the physical payload of the message is not provided to the requesting client in this step.

Processing proceeds to step S530, where message request mod 602 determines that a client, or application, is requesting a connection to a passive messaging engine. The message request mod receives from the client the following information (provided to the client in step S528): (i) message identification(s) for the located message(s); (ii) unique token; and (iii) the location of the recorded passive messaging engine corresponding to the requesting client.

Processing proceeds to step S532, where messaging engine mod 604 determines whether the unique token provided in step S530 is valid. If the unique token is valid, processing proceeds down the "Yes" branch to step S534. If the unique token is not valid, processing proceeds down the "No" branch to step S540.

Following the "Yes" branch, processing proceeds to step S534, where messaging engine mod 604 accepts the client connection to the identified passive messaging engine. Further, message request mod 602, upon acceptance of the connection, provides the identified passive messaging engine with the message identification(s) received in step S530.

Processing proceeds to step S536, where message delivery mod 606 provides for the identified passive messaging engine to retrieve the physical payload for the identified messages and deliver the message(s) to the requesting client.

Processing proceeds to step S538, where messaging engine mod 604 determines that the message is delivered to the requesting client and terminates the connection between the requesting client and the passive messaging engine.

Following, now, the "No" branch from step S532, processing proceeds to step S540, where messaging engine mod 604 rejects the attempt by the requesting client to connect with the identified passive messaging engine. In this example, the connection is not made. Additionally, a message may be returned to the requesting client stating that the identified passive messaging engine is not available. Additionally, the client library may get an error.

Processing proceeds to step S542, where message request mod 602 sends an error notice to active messaging engine 412 over the existing connection, retained in step S526.

Processing proceeds to step S544, where message delivery mod 606 provides for active messaging engine 412 to deliver the physical payload of the message(s) directly to the requesting client.

Regardless of whether the "Yes" or "No" branch of decision step S532 if followed, processing ends at step S546, where messaging engine mod 604 issues a commit/rollback command from the application to the active messaging engine according to the state of the message processing. It is in this step that the message(s), if delivered, are deleted according to the "once and only once delivery" method.

Some embodiments of the present invention may include one, or more, of the following features, characteristics and/or advantages: (i) scalability; (ii) high availability and disaster recovery capabilities for the messaging infrastructure in a cloud environment; (iii) applications can be scattered across multiple cloud zones (across geographical locations); and (iv) the cloud environment can bring the messaging service to any of the geographical locations.

III. ALTERNATIVE ENVIRONMENT

The description that follows is divided into the following sub-sections: (a) The Hardware and Software Environment; and (b) Example Embodiment.

A. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures that follow illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
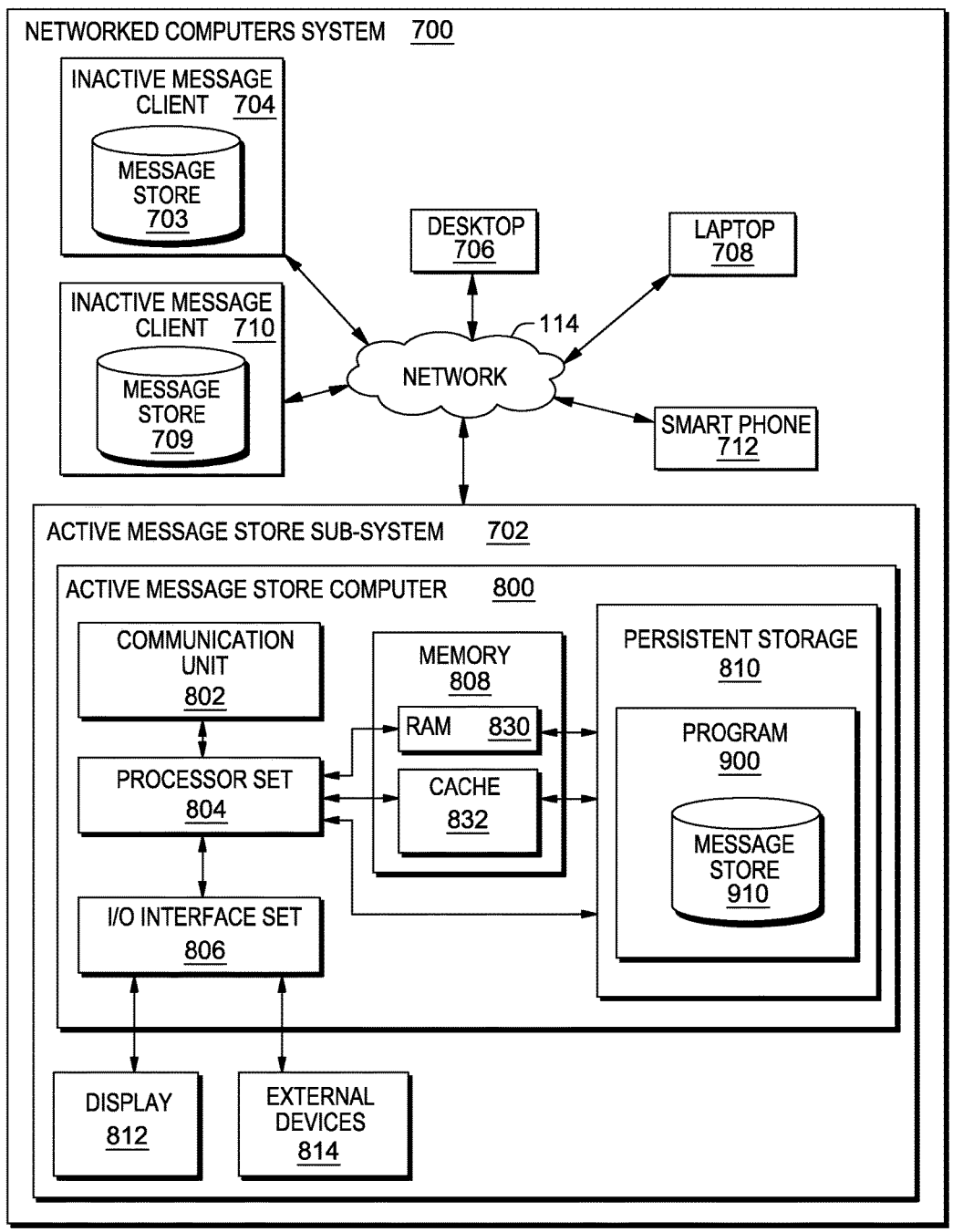
FIG. 7 is a block diagram view of a second embodiment of a system according to the present invention.

An embodiment of a possible hardware and software environment for software and/or methods according to the present invention will now be described in detail with reference to the Figures that follow. FIG. 7 is a functional block diagram illustrating various portions of networked computers system 700, including: active message store sub-system 702; inactive message store sub-systems 704, 710; desktop sub-system 706; laptop sub-system 708; smartphone sub-system 712; communication network 114; active message store computer 800; communication unit 802; processor set 804; input/output (I/O) interface set 806; memory device 808; persistent storage device 810; display device 812; external device set 814; random access memory (RAM) devices 830; cache memory device 832; program 900, and message stores 703, 709, 910.

Sub-system 702 is, in many respects, representative of the various computer sub-system(s) in the present invention. Accordingly, several portions of sub-system 102 will now be discussed in the following paragraphs.

Sub-system 702 may be a laptop computer, tablet computer, netbook computer, personal computer (PC), a desktop computer, a personal digital assistant (PDA), a smart phone, or any programmable electronic device capable of communicating with the client sub-systems via network 114. Program 900 is a collection of machine readable instructions and/or data that is used to create, manage, and control certain software functions that will be discussed in detail, below, in the Example Embodiment sub-section of this Detailed Description section.

Sub-system 702 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 702 is shown as a block diagram with many double arrows. These double arrows (no separate reference numerals) represent a communications fabric, which provides communications between various components of sub-system 702. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 808 and persistent storage 810 are computer-readable storage media. In general, memory 808 can include any suitable volatile or non-volatile computer-readable storage media. It is further noted that, now and/or in the near future: (i) external device(s) 814 may be able to supply, some or all, memory for sub-system 702; and/or (ii) devices external to sub-system 702 may be able to provide memory for sub-system 102.

Program 900 is stored in persistent storage 810 for access and/or execution by one or more of the respective computer processors 804, usually through one or more memories of memory 808. Persistent storage 810: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 810.

Program 900 may include both machine readable and performable instructions and/or substantive data (that is, the type of data stored in a database). In this particular embodiment, persistent storage 810 includes a magnetic hard disk drive. To name some possible variations, persistent storage 810 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 810 may also be removable. For example, a removable hard drive may be used for persistent storage 810. Other examples include optical and magnetic disks, thumb drives, and smart cards that are inserted into a drive for transfer onto another computer-readable storage medium that is also part of persistent storage 810.

Communications unit 802, in these examples, provides for communications with other data processing systems or devices external to sub-system 702. In these examples, communications unit 802 includes one or more network interface cards. Communications unit 802 may provide communications through the use of either or both physical and wireless communications links. Any software modules discussed herein may be downloaded to a persistent storage device (such as persistent storage device 810) through a communications unit (such as communications unit 802).

I/O interface set 806 allows for input and output of data with other devices that may be connected locally in data communication with active message store computer 800. For example, I/O interface set 806 provides a connection to external device set 814. External device set 814 will typically include devices such as a keyboard, keypad, a touch screen, and/or some other suitable input device. External device set 814 can also include portable computer-readable storage media such as, for example, thumb drives, portable optical or magnetic disks, and memory cards. Software and data used to practice embodiments of the present invention, for example, program 900, can be stored on such portable computer-readable storage media. In these embodiments the relevant software may (or may not) be loaded, in whole or in part, onto persistent storage device 810 via I/O interface set 806. I/O interface set 806 also connects in data communication with display device 812.

Display device 812 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

B. Example Embodiment

Figure 8:
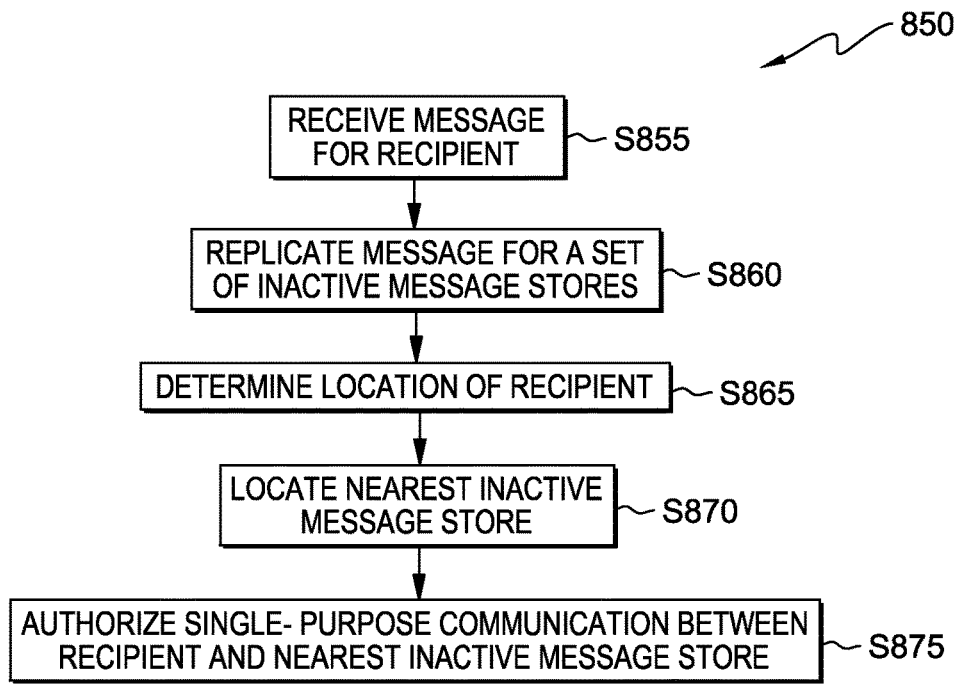
FIG. 8 is a flowchart showing a method performed, at least in part, by the second embodiment system.
Figure 9:
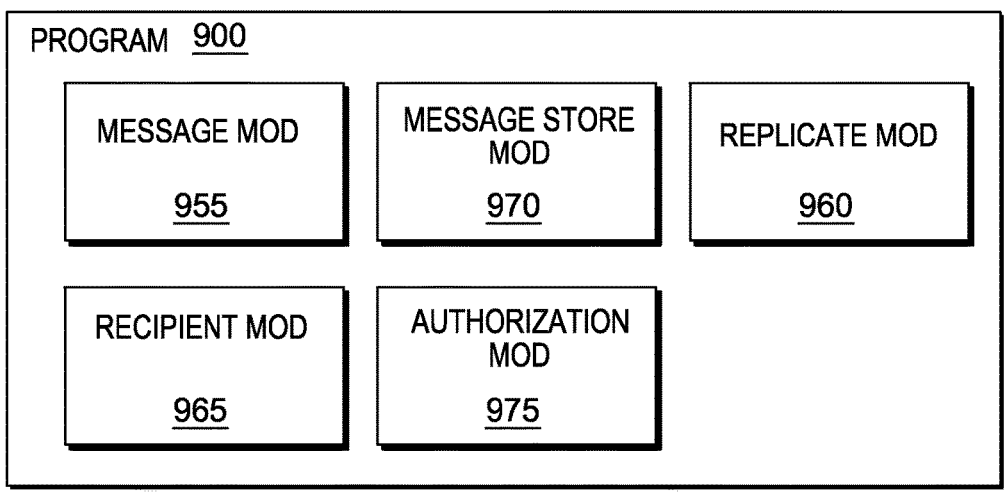
FIG. 9 is a block diagram view of a machine logic (for example, software) portion of the second embodiment system.

FIG. 8 shows flowchart 850 depicting a method according to the present invention. FIG. 9 shows program 900 for performing at least some of the method steps of flowchart 850. This method and associated software will now be discussed, over the course of the following paragraphs, with extensive reference to FIG. 8 (for the method step blocks) and FIG. 9 (for the software blocks).

Processing begins at step S855, where message module ("mod") 955 receives a message for recipient. Recipient may be, for example, smart phone 712. In this example, messages are delivered only once according to the once and only once delivery model. For example, when a message such as a notice regarding data usage is received, that is, consumed by the user of smart phone 712, the message is no longer available for receipt or reading at a later time.

Processing proceeds to step S860, where replicate mod 960 replicates message for a set of inactive message stores, such as inactive message store sub-systems 703 and 709. In this example, users cannot access any inactive message store directly, but must communicate through active message store sub-system 102.

Processing proceeds to step S865, where recipient mod 965 determines the location of the target recipient of the message received in step S855. Continuing with the above example, the recipient mod determines the location of smart phone 712 within networked computers system 700.

Processing proceeds to step S870, where message store mod 970 locates the nearest inactive message store. For example, the message store mod determines that message store 703, of inactive message store sub-system 704 is the nearest inactive message store to smart phone 712. As discussed earlier, the IP address may be used to determine the nearest inactive message store. In some embodiments, the locations of the various message stores are stored in a cache. Alternatively, locations of message stores are determined using conventional geo-location solutions. Alternatively, a nearest message store is identified using conventional geo-location solutions. In this example, the location information for both the target recipient and the nearest inactive message store is maintained in RAM, temporarily, for access during the following step. Alternatively, the location of the target recipient and the location of the nearest inactive message store are stored in persistent memory.

Processing ends at step S875, where authorization mod 975, authorizes a single-purpose communication between recipient and the nearest inactive message store. Continuing with the above example, the authorization mod, by way of authorization, provides smart phone 712 with access data that allows the smart phone to communicate, for this instance, with message store 703 to retrieve the message replicated in message store 703 at step S860. In this example, the following access data is provided by the authorization mod: (i) message identification(s) for the message received in step S855; (ii) unique token; and (iii) the location of the nearest inactive message store corresponding to the recipient.

Some embodiments of the present invention have multiple data centers (or multiple zones), where there is either a synchronous or an asynchronous replication happening between data centers for the stored data. For scalability, the applications run across the data centers. It should be noted that applications running in a second data center, which is "passive," may be required by rule to always connect to the messaging engine in a first data center. In that way, the application retrieves data from its local data center, the second data center, instead of retrieving it from the first data center, which may be located at a great geographic distance.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product for providing a message to a recipient, the computer program product comprising a computer readable storage medium having stored thereon:
   first program instructions programmed to determine that the message is received by a first message store for a recipient device, wherein the first message store is a component of an active messaging engine within a multi-zone cloud computing environment;
   second program instructions programmed to locate a second message store where the recipient device can retrieve the message, wherein the second message store is a component of a passive messaging engine within the multi-zone cloud computing environment;
   third program instructions to determine if the message is located in a message repository;

responsive to determining the message is located in the message repository, forth program instructions to lock the located message for the recipient device at the first message store and retrieving: message identification data for the located message, a unique token, and the location of the recorded second message store corresponding to the recipient device;

fifth program instructions comprising:

program instructions to authorize a single-purpose communication between the recipient device and the second message store, the single-purpose communication having a single purpose of retrieving the message;

wherein:

the message is duplicated in the second message store; and the first message store and second message store are operating within a message delivery model that guarantees delivery of the message to the recipient device, allows the message to be delivered to the recipient device only once, and requires that the recipient device communicate with the first message store when retrieving the message.

2. The computer program product of claim 1, wherein: the multi-cloud environment is a once and only once message delivery model.

3. The computer program product of claim 1, wherein: the first message store is located in a first network datacenter; and the second message store and the recipient device are co-located in a second network datacenter, the first and the second network datacenters being located in different geographic locations.

4. The computer program product of claim 1, wherein the second message store is a replicated instance of the first message store, such that the message received by the first message store is duplicated in the second message store.

5. The computer program product of claim 1, wherein the second program instructions include:

program instructions to determine a nearest message store, the nearest message store and the recipient device being in closest electrical communication; and program instructions to designate the nearest message store as the second message store.

6. A computer system for providing a message to a recipient within a computer network, the computer system comprising:

a processor(s) set; and a computer readable storage medium;

wherein:

the processor set is structured, located, connected, and/or programmed to run program instructions stored on the computer readable storage medium; and the program instructions include:

first program instructions programmed to determine that the message is received by a first message store for a recipient device, wherein the first message store is a component of an active messaging engine within a multi-zone cloud computing environment;

second program instructions programmed to locate a second message store where the recipient device can retrieve the message, wherein the second message store is a component of a passive messaging engine within the multi-zone cloud computing environment;

third program instructions to determine if the message is located in a message repository;

responsive to determining the message is located in the message repository, forth program instructions to lock the located message for the recipient device at the first message store and retrieving: message identification data for the located message, a unique token, and the location of the recorded second message store corresponding to the recipient device;

fifth program instructions comprising:

program instructions to authorize a single-purpose communication between the recipient device and the second message store, the single-purpose communication having a single purpose of retrieving the message;

wherein:

the message is duplicated in the second message store; and the first message store and second message store are operating within a message delivery model that guarantees delivery of the message to the recipient device, allows the message to be delivered to the recipient device only once, and requires that the recipient device communicate with the first message store when retrieving the message.

7. The computer system of claim 6, wherein the message delivery model is a once and only once message delivery model.

8. The computer system of claim 6, wherein:

the first message store is located in a first network datacenter; and the second message store and the recipient device are co-located in a second network datacenter, the first and the second network datacenters being located in different geographic locations.

9. The computer system of claim 6, wherein the second message store is a replicated instance of the first message store, such that the message received by the first message store is duplicated in the second message store.

10. The computer system of claim 6, wherein the second program instructions include:

program instructions to determine a nearest message store, the nearest message store and the recipient device being in closest electrical communication; and program instructions to designate the nearest message store as the second message store.

* * * * *